United States Patent [19]
van der Pol

[11] Patent Number: 5,747,704
[45] Date of Patent: May 5, 1998

[54] METER FOR FLOWING MEDIA

[75] Inventor: Ronald van der Pol, Venlo, Netherlands

[73] Assignee: Krohne Messtechnik GmbH & Co., KG, Germany

[21] Appl. No.: 540,203

[22] Filed: Oct. 6, 1995

[30] Foreign Application Priority Data

Oct. 7, 1994 [DE] Germany .................. 44 35 809.1

[51] Int. Cl.[6] .................................................. G01F 1/84
[52] U.S. Cl. ........................................... 73/861.357
[58] Field of Search ................... 73/861.351, 861.355, 73/861.356, 861.354, 204.25

[56] References Cited

U.S. PATENT DOCUMENTS

| | | | |
|---|---|---|---|
| 5,295,398 | 3/1994 | Lew | 73/861.38 |
| 5,363,706 | 11/1994 | Lew | 73/861.38 |
| 5,381,697 | 1/1995 | Van Der Pol | 73/861.37 |
| 5,501,106 | 3/1996 | Lew et al. | 73/861.038 |

FOREIGN PATENT DOCUMENTS

| | | | |
|---|---|---|---|
| 0275367 | 7/1988 | European Pat. Off. | |
| 0448913 | 10/1991 | European Pat. Off. | |
| 58-165016 | 9/1983 | Japan | 73/861.357 |
| 58-123429 | 10/1983 | Japan | G01F 1/84 |
| 2221302 | 4/1988 | United Kingdom | |

OTHER PUBLICATIONS

Automatisierungstechnische Praxis—ATP, Bd.34, nr. 3, Mar. 1992, Munchen De, Pp.123–127, XP000270859,Armin Brucker, et. al.

Patent Abstracts of Japan, p. 230 Oct. 18, 1983, vol. 7, No. 234 Mass Flow Meter, Yokogawa Denki Seisakusho, K.K.

*Primary Examiner*—Richard Chilcot
*Assistant Examiner*—Jewel Artis
*Attorney, Agent, or Firm*—Cesari and McKenna, LLP

[57] ABSTRACT

A meter for flowing media, which preferably operates according to the Coriolis principle, with at least one conduit conducting the flowing medium, with at least one oscillation generator acting on the conduit, and with at least one transducer detecting preferably Coriolis forces and/or Coriolis oscillations based on Coriolis effects. With the transducer described, an electric current flows through at least a section of the conduit and/or the flowing medium.

20 Claims, 5 Drawing Sheets

METER FOR FLOWING MEDIA

FIELD OF THE INVENTION

This invention concerns a meter for flowing media, which preferably operates according to the Coriolis principle, with at least one conduit conducting the flowing medium, with at least one oscillation generator acting on said conduit, and with at least one transducer detecting preferably Coriolis forces and/or Coriolis fluctuations based on Coriolis forces.

BACKGROUND OF THE INVENTION

Meters for flowing media of the type described are used both for density measurement of the flowing medium as well as, as already mentioned, for determining the mass flow of the flowing medium according to the Coriolis principle. The discussion below always refers to mass flow meters for flowing media, which operate according to the Coriolis principle, but this is not to be taken as a limitation.

Mass flow meters for flowing media, which operate according to the Coriolis principle are known in different designs (cf. German Offenlegungsschriften 26 29 833, 28 22 087, 28 33 037, 29 38 498, 30 07 361, 33 29 544, 34 43 234, 35 03 841, 35 05 166, 35 26 297, 37 07 777, 39 16 285, 40 16 207, 41 24 295, 41 43 361, 42 00 060, 43 27 052, 44 13 239, 44 17 332, 44 17 516, and 44 23 168, European Offenlegungsschriften 0 083 144, 0 109 218, 0 119 638, 0 196 150, 0 210 308, 0 212 782, 0 232 679, 0 235 274, 0 243 468, 0 244 692, 0 271 605, 0 275 367, and 0 282 552, French Offenlegungsschrift 2 598 801, as well as U.S. Pat. No. 4,491,009, 4,628,744, 4,666,410, 4,803,867, and 4,962,678) and are being used increasingly.

It is common to all mass flow meters which work according to the Coriolis principle that the Coriolis forces caused by the mass flow and to be evaluated are very small in relation to the other forces involved in the motion of the conduit. This leads to the fact that the Coriolis forces change the basic motion only slightly. In the case of the known mass flow measurement devices, the basic motion of the conduit is changed by other different influences in addition to the Coriolis forces. For example, these changes appear because of the transducers and oscillation generators attached to the conduit in the case of all known mass flow meters. These additional masses mounted on the conduit, on the one hand, reduce the influence of the Coriolis forces on the motion of the conduit because of their own mass, and, on the other hand, lead to the fact that the conduits are changed mechanically in an insufficiently defined way by the attachment of the masses, for example by soldering or welding. Both influences lead to a reduction of the measurement effect, a lower measurement accuracy, and hard-to-define long-term behavior, and play a role, in particular in the case of mass flow devices of small rated mass flow, i.e., smaller design and thus less conduit mass. In particular, a high mass of conduit including attachments, i.e., of the system capable of oscillation, leads to a lower resonance frequency, equivalent to lower Coriolis forces, and thus a reduced measurement effect. Moreover, in the case of masses symmetrically mounted on the conduit, such as, for example, the transducers in general, very precise mechanical tolerances are to be maintained. This requirement leads to an expensive production process.

SUMMARY OF THE INVENTION

Thus, the object of the invention is to design the known meters for flowing media in such a way that the conduits conducting the flowing media can be made largely free of hard-to-define influences with low mass.

In accordance with the invention, the above-mentioned object is achieved by means of the fact that an electric current flows through at least a section of the conduit and/or the flowing medium. The measure invented ensures that a magnetic field, which makes contactless excitation and detection of the motion of the conduit possible without attachments, is formed in the environment of the conduit of the meter.

In a first development of the meter invented, the conduit can be excited via an oscillation generator formed by an electric current flowing through the conduit and/or the flowing medium and an external magnetic field surrounding at least a section of the conduit. This measure makes it possible to have a contactless excitation of the conduit by the interaction of the magnetic field produced by the electric current flowing through the conduit and the possibly conducting, flowing medium and the external magnetic field.

Therefore, this eliminates the attachment of a part of an oscillation generator of the usual type on the conduit, so that the oscillation generator changes neither the mass of the conduit nor its mechanical properties.

In order for the conduit to oscillate, which, of course, is necessary for the measurement of the mass flow or the density of the flowing medium, either the external magnetic field can be an alternating field and the electric current can be a direct current, or the external magnetic field can be a steady field and electric current can be an alternating current, or finally, the external magnetic field can be an alternating field and the electric current can be an alternating current with the same frequency as the alternating field.

The electric current flow through the conduit is created particularly advantageously by having the ends of the conduit short-circuited via a meter housing and/or ground and by the fact that the electric current through the conduit can be coupled in the conduit according to the transformer principle. This ensures that the electric current is induced galvanically isolated in the conduit, which means that no connection contacts between the conduit and a current source are necessary. This measure naturally assumes that an alternating current is to be induced in the conduit. Further, the meter is designed so that the motion of the conduit is detectable via a transducer formed by the electric current flowing through the conduit and/or the flowing medium and the coil located in the vicinity of the conduit. This design of the meter in accordance with the invention leads to the fact that the measurement values are picked up without contact, thus ensuring that no masses influencing the motion and the mechanical properties of the conduit have to be attached to the conduit.

Finally, in a further development of the meter in accordance with the invention, the conduit consists of an insulating material coated from outside with a conducting material. Such a measure ensures that the electric current does not flow through the flowing medium. This is advantageous for galvanic reasons, depending on the flowing medium.

BRIEF DESCRIPTION OF THE DRAWINGS

The measurements device for flowing media in accordance with the invention is explained below by means of drawings showing only one specific embodiment. In the drawings.

DESCRIPTION OF THE PREFERRED EMBODIMENT

Figure 1:
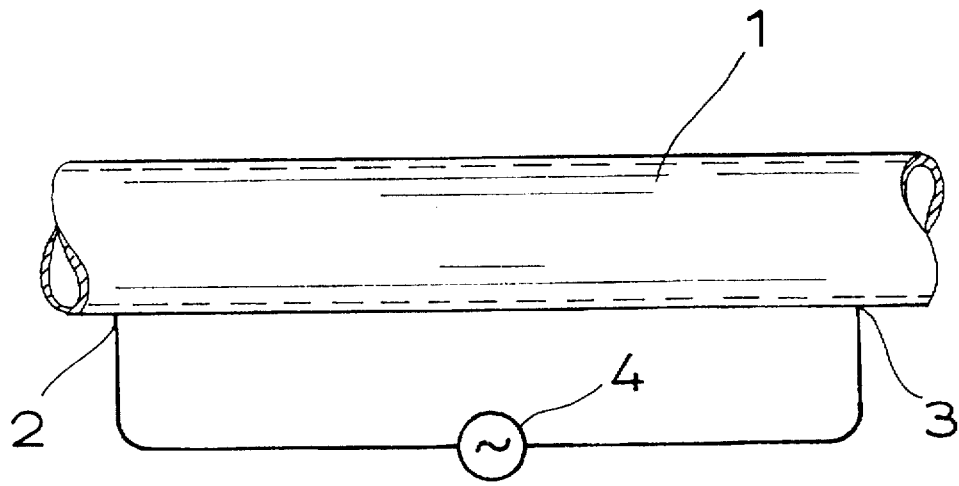
FIG. 1 shows a section of a conduit of a measurement device in accordance with the invention with an alternating voltage source connected to it.
Figure 2:
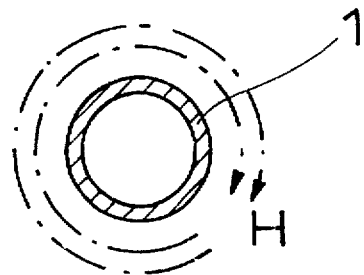
FIG. 2 shows the FIG. 1 conduit section in cross-section with the field line pattern of an associated magnetic field indicated.
Figure 3:
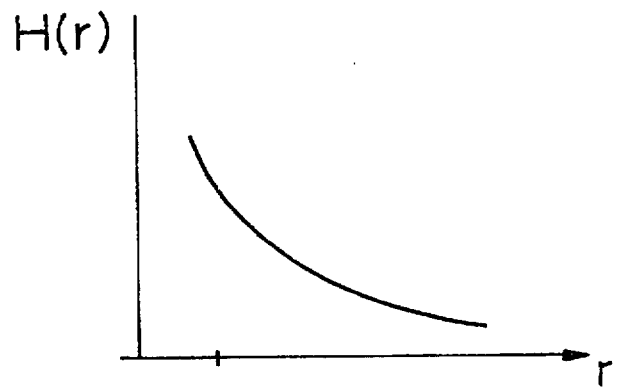
FIG. 3 is a graph of the magnetic field in relation to the distance from the conduit.

FIG. 1 shows a section of a conduit 1, conducting a flowing medium, of a meter for flowing media in accordance with the invention, which operates according to the Coriolis principle. The section of the conduit 1 shown in FIG. 1 is connected to two contacts 2, 3 with a voltage source 4. The voltage source 4 supplies an electric current to the section of conduit 1 located between the contacts 2 and 3. This electric current causes, as shown in FIG. 2, the formation of a magnetic field H in the environment of conduit 1. The strength of the magnetic field H decreases, as shown in FIG. 3, for distances greater than the radius R of the conduit 1 of interest herein, in inverse proportion to the distance from the conduit 1. The magnetic field H surrounding the conduit 1 makes it possible to excite the conduit 1 without contact and to record its motions without contact. This ensures advantageously that no masses additionally attached to the conduit 1 influence the motion of the conduit 1.

Figure 4:
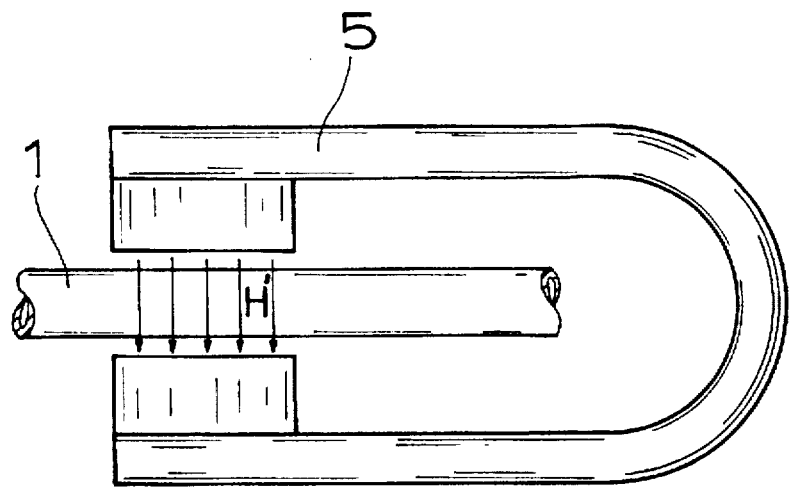
FIG. 4 shows a conduit section of the meter in accordance with the invention with a surrounding external magnetic field.

FIG. 4 shows a permanent magnet 5 in a horseshoe form, which provides an external magnetic field H' surrounding at least a section of the conduit 1. Since, in the case of the external magnetic field H' provided by the permanent magnet 5, necessarily there is a steady field, the electric current through the conduit 1 must be an alternating current. In this case, the alternating effect between the magnetic field produced by the alternating current through the conduit 1 and the external magnetic field supplied by the permanent magnet 5 provides for an excitation of the conduit 1 conducting the flowing medium. In the case of a stainless steel conduit 1 of around 2 mm in external diameter and a wall thickness of around 1 mm, a current of around 2 A in connection with the magnetic field of an ordinary permanent magnet 5 provides a sufficient force for driving the conduit 1 without a significant power load over the conduit 1.

Figure 5:
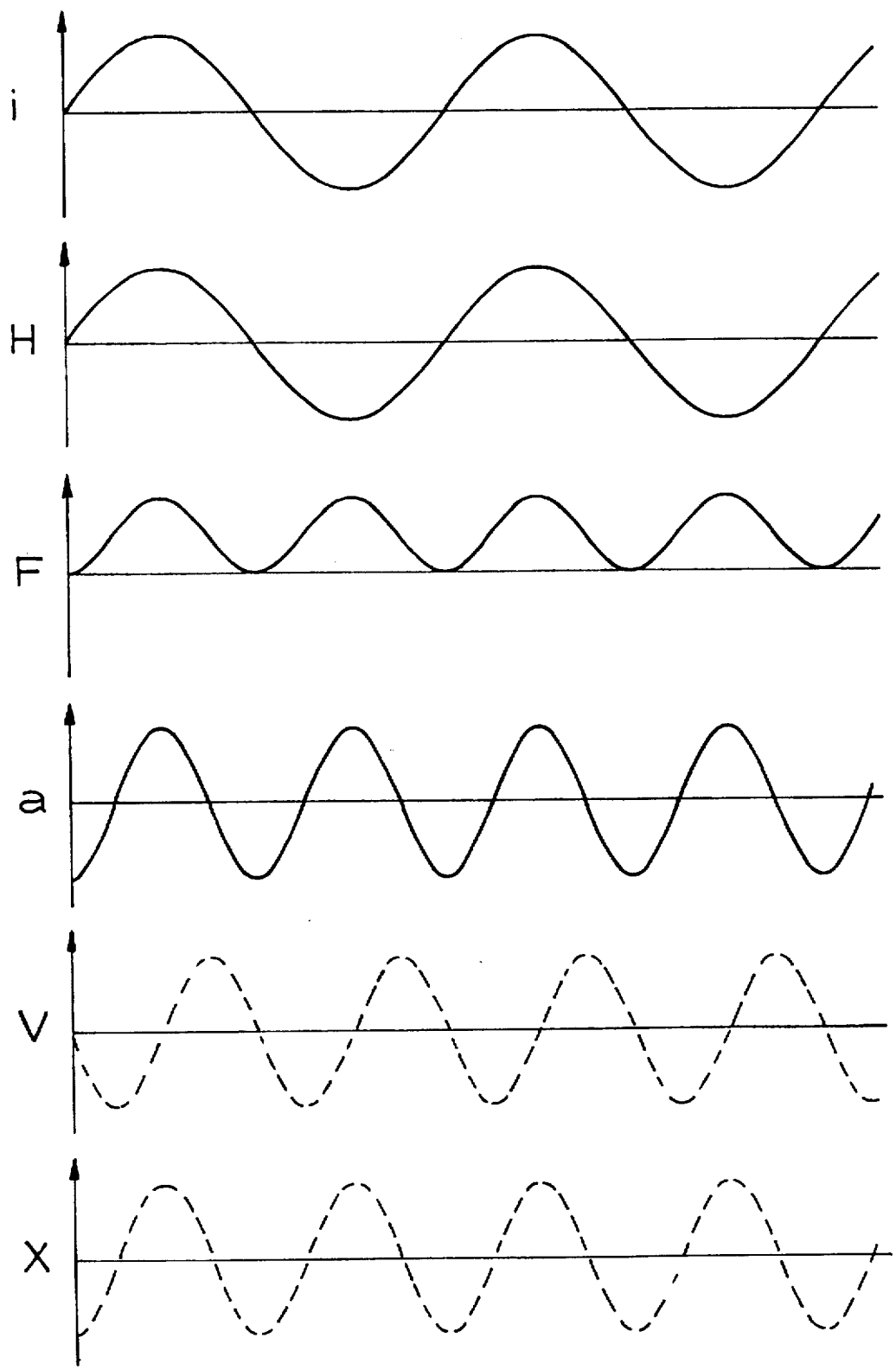
FIG. 5 shows a phase relation of several physical values during motion of the conduit section without damping.

How the alternating current i, the magnetic field strength H, the force F acting on the conduit 1, the acceleration a acting on the conduit 1, the velocity v of the fluid in conduit 1, and the position x of the conduit 1 behave in relation to the time without damping of the conduit is shown in FIG. 5. In particular, FIG. 5 shows the case in which both the magnetic field is made as an alternating field and the electric current is made as an alternating current at the same frequency, which is particularly interesting for the detection of the motion of the conduit 1. The interaction of the alternating current and the alternating field lead to superposition of a constant force dependent on the phase difference between alternating field and alternating current with a force of twice the frequency of the alternating current frequency.

Since the voltage of the excited conduit 1 has a portion of counter-induced voltage, and since in the resonance operation and in the case of a conduit 1 with a high Q factor, the mechanical power losses in conduit 1 are very small, the voltage over the conduit 1 can be used, for example, as the true value of the amplitude of the oscillation of conduit 1 for a regulating circuit.

Figure 6:
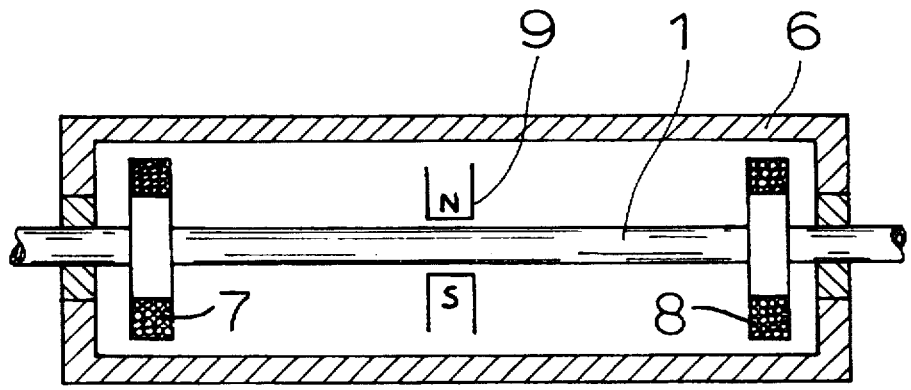
FIG. 6 shows a meter in which the electric current is coupled to the conduit according to the transformer principle.

Refer now to FIG. 6 which shows a mass flow meter in the case of which the ends of the conduit 1 are short-circuited via a meter housing 6 and ground. Of course, instead of the meter housing 6, a special conducting connection also can provide the short circuit between the ends of conduit 1. In the case of the mass flow meter shown in FIG. 6, the electric current through conduit 1 is connected to conduit 1 according to the transformer principle via two ring core transformers 7 and 8. In this case, the measuring tube with its ends short-circuited via the meter housing 6 forms the secondary winding of the ring core transformers 7 and 8. In the case of such an arrangement, as is known, the amount of the electric current through the conduit 1 consists of the sum of the products of winding number and current of both ring core transformers 7 and 8. Of course, the electric current induced in conduit 1 is an alternating current. The magnetic field caused by this alternating current provides for the excitation of the conduit 1 because of the interaction with the external magnetic field of the magnet 9 shown in FIG. 6. The magnet 9 can be made both as a permanent magnet as well as an electromagnet. Different from that shown in FIG. 6, a single ring core transformer is sufficient to connect an electric current to the conduit 1.

Figure 7:
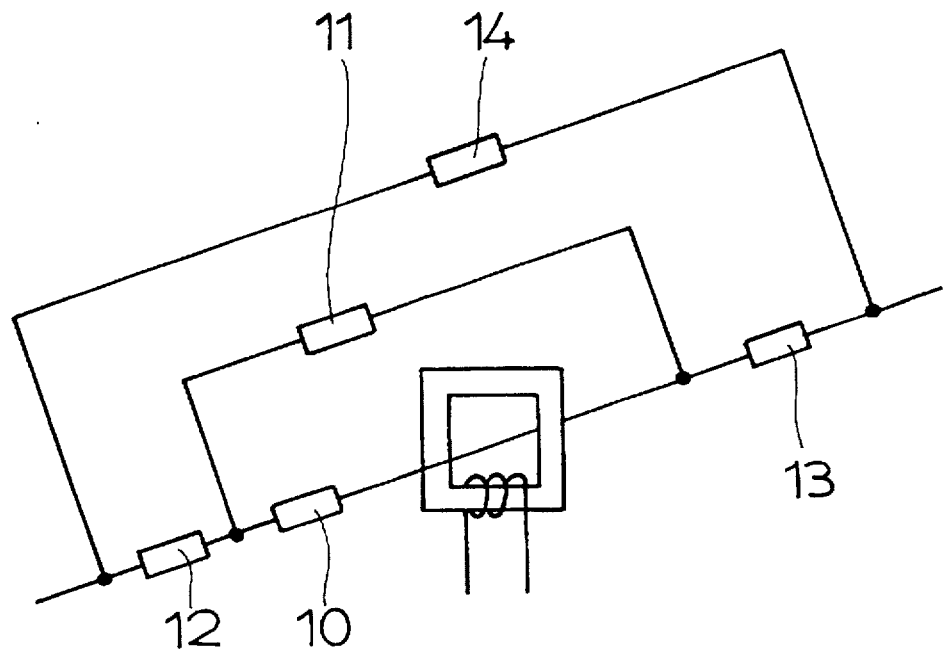
FIG. 7 shows an equivalent circuit diagram for the electric current flow in the case of the meter shown in FIG. 6.
Figure 8:
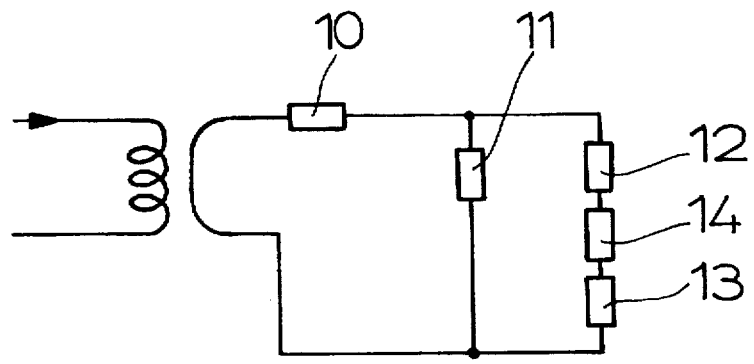
FIG. 8 shows the equivalent circuit diagram shown in FIG. 7 reduced to the electrical aspect.

Without further measures, it is not possible to prevent the current connected to the conduit 1, as shown in FIG. 6, also from being short-circuited via ground. This is shown in the equivalent circuit diagram in FIG. 7. In FIG. 7, the actual resistances are shown by a conduit resistance 10, a meter resistance 11, a left connecting conduit resistance 12, a right connecting conduit resistance 13, and a ground connection resistance 14. The left and right connecting conduit resistances reproduce the resistance of the ends of the conduit up to the ground potential. As is evident from the equivalent circuit diagram in FIG. 8, reduced to the electrical aspect, a further advantage of the electric current connected to the conduit 1 according to the transformer principle, in addition to the galvanic isolation, consists in the fact that the coupled current, as opposed to the connection of the current as is shown in FIG. 1, is nearly independent of the connecting conduit resistances 12 and 13.

Figure 9:
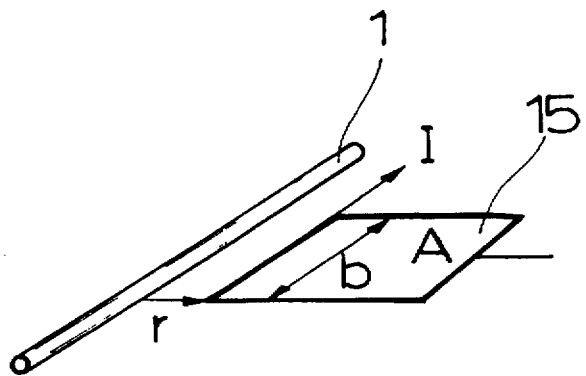
FIG. 9 shows schematically a specific embodiment of a coil for detecting the motion of the conduit section.

FIG. 9 shows a specific embodiment of a coil 15 with a winding located in the vicinity of the conduit 1. Coil 15 makes detection of the motion of conduit 1 by means of the voltage induced in the coil 15 possible. The amplitude of the coil signal and the signal-to-noise ratio of a coil is increased with winding number of the coil. Coil 15, just as other magnetic field sensors, for example Hall probes, field plates and others, makes contactless detection of the motion of the conduit 1 possible. The sensitivity of the coil 15 as a transducer may be increased by the fact that a second coil (not shown) may be mounted symmetrical to the conduit 1 on the other side of the conduit 1. In this case, the coil signal is doubled. The coil signals are in the range of 10 μv in 1)

the case of currents I of a few amperes through the conduit 1, in 2) the case of a distance R of a few millimeters between the conduit 1 and the coil 15, in 3) the case of a width b of the coil of a few centimeters, in 4) the case of the coil surface A of a few square centimeters, and in 5) a resonance frequency of the conduit 1 in the region of a few 100 Hz per winding. Therefore, in the case of a correspondingly high winding number of a few hundred windings, one obtains a coil signal which is very easy to process electronically. For the signal-to-noise ratio essentially the thermal noise in the coil winding is of significance. In the case of the coil arrangement described as an example, thermal noise amounts to a few pv. This is an acceptable value also if the phase shift caused by the Coriolis forces clearly amounts to less than 1° in the case of 100% of the rated mass flow through the mass flow meter.

Figure 10:
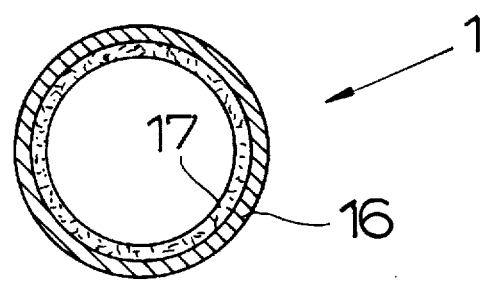
FIG. 10 is a cross-sectional view of a specific embodiment of a conduit section consisting of insulating material with an outer, conducting coating.

Finally, FIG. 10 shows a conduit 1 which consists of a line of insulating material 17 coated with a layer of conducting material 16. Such an arrangement ensures that no electric current flows through the flowing medium. This is advantageous independent of the flowing medium, as already described above, for galvanic reasons. For example, glass, glass ceramic, etc. can be used as the insulating material. The material for the coating is to be chosen from different points of view. The essential points of view are the specific resistance, the specific weight, as well as the E-modulus of the material. The specific resistance should not be too great, in order not to increase the resistance value per unit length of the conduit 1. The specific weight should be as low as possible in order to keep the total mass of the conduit 1 low. The E-modulus plays a role in the oscillation properties of the compound conduit 1. Obviously, there must also be a technological aspect taken into account. For example, aluminum, copper, silver, and gold may be mentioned as suitable materials fro the layer of conducting material 16. In the case of a coating of the conduit consisting of insulating material with a few 10 μm of gold, one obtains approximately the same resistance values as in the case of stainless steel conduits with an overall diameter of several millimeters and a conduit wall thickness in the area of one millimeter. The connection of the electric current according to the transformer principle also is possible in the case of the conduit 1 shown in FIG. 10. In this case, there is also the possibility of avoiding electric currents by means of the connecting lines. In addition, the corresponding insulating design of the connecting lines ensures that connecting lines with different potentials do not lead to disturbing electric currents through the conduit 1.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed is:

1. A meter for flowing media which operates according to the Coriolis principle, with at least one conduit conducting the flowing medium, with an electric current supplied from a voltage source flowing through at least a section of the conduit and/or the flowing medium, with at least one oscillation generator acting on said conduit, said oscillation generator formed by the electric current flowing through the conduit and/or the flowing medium and an external magnetic field surrounding at least a section of the conduit and with at least one transducer detecting Coriolis forces and/or Coriolis oscillations based on Coriolis forces characterized in that the amplitude of the oscillation of said conduit can be derived from the voltage drop over said conduit.

2. The meter defined in claim 1 wherein the motion of said conduit may be detected via a transducer formed by the electric current flowing through the conduit and/or the flowing medium and a coil located in the vicinity of the conduit.

3. The meter defined in claim 1 or 2 wherein said conduit consists of an insulated material coated on the outside with a conducting material.

4. The meter defined in claim 1 or 2 wherein the external magnetic field is an alternating field and the electric current is an alternating current.

5. The meter defined in claim 3 wherein the external magnetic field is an alternating field and the electric current is an alternating current.

6. A meter for flowing media which operates according to the Coriolis principle, with at least one conduit conducting the flowing medium, with an electric current supplied from a voltage source flowing through at least a section of the conduit and/or the flowing medium, with at least one oscillation generator acting on said conduit, said oscillation generator formed by the electric current flowing through the conduit and/or the flowing medium and an external magnetic field surrounding at least a section of the conduit and with at least one transducer detecting Coriolis forces and/or Coriolis oscillations based on Coriolis forces characterized in that the motion of said conduit may be detected via a transducer formed by the electric current flowing through the conduit and/or the flowing medium and a coil located in the vicinity of the coil.

7. The meter defined in claim 6, wherein the amplitude of the oscillation of said conduit can be derived from the voltage drop over the conduit.

8. The meter defined in claim 6 or 7, wherein said conduit consists of an insulating material coated on the outside with a conducting material.

9. The meter defined in claim 6 or 7, wherein the external magnetic field is an alternating field and the electric current is an alternating current.

10. The meter defined in claim 8, wherein the external magnetic field is an alternating field and the electric current is an alternating current.

11. A meter for flowing media which operates according to the Coriolis principle, with at least one conduit conducting the flowing medium, with an electric current supplied from a voltage source flowing through at least a section of the conduit and/or the flowing medium, with at least one oscillation generator acting on said conduit, said oscillation generator formed by the electric current flowing through the conduit and/or the flowing medium and an external magnetic field surrounding at least a section of the conduit and with at least one transducer detecting Coriolis forces and/or Coriolis oscillations based on Coriolis forces characterized in that said conduit consists of an insulating material coated on the outside with a conducting material.

12. The meter defined in claim 11 wherein the amplitude of the oscillation of said conduit can be derived from the voltage drop over the conduit.

13. The meter defined in claim 11 or 12, wherein the motion of said conduit may be detected via a transducer formed by the electric current flowing through the conduit and/or the voltage medium and a coil located in the vicinity of the conduit.

14. The meter defined in claim 2 or 12, wherein the external magnetic field is an alternating field and the electric current is an alternating current.

15. The meter defined in claim 13, wherein the external magnetic field is an alternating field and the electric current is an alternating current.

16. A meter for flowing media which operates according to the Coriolis principle, with at least one conduit conducting the flowing medium, with an electric current supplied from a voltage source flowing through at least a section of the conduit and/or the flowing medium, with at least one oscillation generator acting on said conduit, said oscillation generator formed by the electric current flowing through the conduit and/or the flowing medium and an external magnetic field surrounding at least a section of the conduit and with at least one transducer detecting Coriolis forces and/or Coriolis oscillations based on Coriolis forces characterized in that the external magnetic field is an alternating field and the electric current is an alternating current.

17. The meter defined in claim 16, wherein the amplitude of the oscillation of said conduit can be derived from the voltage drop over the conduit.

18. The meter defined in claim 16 or 17, wherein the motion of said conduit may be detected by a transducer formed by the electric current flowing through the conduit and/or the flowing medium and the coil located in the vicinity of the conduit.

19. The meter defined in claim 16 or 17, wherein said conduit consists of an insulating material coated on the outside with a conducting material.

20. The meter defined in claim 18 wherein said conduit consists of an insulated material coated on the outside with a conducting material.

* * * * *